US 8,272,989 B2

(12) United States Patent
Baasch et al.

(10) Patent No.: US 8,272,989 B2
(45) Date of Patent: Sep. 25, 2012

(54) VARIABLE RATIO TRANSMISSION FOR DISTRIBUTING A DRIVE TORQUE TO AT LEAST TWO OUTPUT SHAFTS

(75) Inventors: Detlef Baasch, Friedrichshafen (DE); Christoph Pelchen, Tettnang (DE); Thomas Rosemeier, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 421 days.

(21) Appl. No.: 12/596,185

(22) PCT Filed: Apr. 24, 2008

(86) PCT No.: PCT/EP2008/054965
§ 371 (c)(1),
(2), (4) Date: Oct. 16, 2009

(87) PCT Pub. No.: WO2008/141887
PCT Pub. Date: Nov. 27, 2008

(65) Prior Publication Data
US 2010/0137095 A1    Jun. 3, 2010

(30) Foreign Application Priority Data
May 19, 2007   (DE) .................. 10 2007 023 462

(51) Int. Cl.
*F16H 48/30* (2012.01)
(52) U.S. Cl. ........................................ 475/150
(58) Field of Classification Search .............. 475/5, 150, 475/151, 152, 198, 201, 207, 221, 329
See application file for complete search history.

(56) References Cited

U.S. PATENT DOCUMENTS

| 5,387,161 | A | 2/1995 | Shibahata |
| 6,009,849 | A | 1/2000 | Yamamoto et al. |
| 6,056,660 | A | 5/2000 | Mimura |
| 7,056,252 | B2 | 6/2006 | Gumpoltsberger et al. |
| 7,311,631 | B2 * | 12/2007 | Kushino ........................ 475/221 |
| 7,479,088 | B2 | 1/2009 | Baasch et al. |
| 7,500,933 | B2 | 3/2009 | Baasch et al. |
| 7,872,380 | B2 * | 1/2011 | Rossegger et al. .............. 310/36 |
| 2005/0143210 | A1 * | 6/2005 | Hamai et al. .................. 475/150 |
| 2007/0023211 | A1 * | 2/2007 | Keller et al. .................. 180/65.2 |
| 2007/0249456 | A1 | 10/2007 | Meixner |

FOREIGN PATENT DOCUMENTS

| DE | 697 10 003 T2 | 2/1998 |
| DE | 103 19 684 A1 | 12/2004 |
| DE | 103 48 959 A1 | 5/2005 |

(Continued)

*Primary Examiner* — David D Le
*Assistant Examiner* — David J Hlavka
(74) *Attorney, Agent, or Firm* — Davis & Bujold, PLLC

(57) ABSTRACT

A variable-ratio transmission for distributing a drive torque to at least two drive output shafts (8, 9), comprising a conventional differential (1) is proposed, which comprises an electric motor (5) for distributing the drive torque directly between the drive output shafts (8, 9) and a plus planetary gearset (2) that serves as a variable-ratio unit, such that the plus planetary gearset (2) is arranged coaxially with a drive input shaft (8), the outer sun gear (3) of the plus planetary gearset (2) is connected to the output (8), on the side of the differential (1) facing toward the planetary gearset (2), and the web (4) of the planetary gearset (2) is connected to the electric motor (5), and such that the inner sun gear (6) of the planetary gearset (2) is connected by a countershaft (7) to the other drive output shaft (9).

7 Claims, 1 Drawing Sheet

FOREIGN PATENT DOCUMENTS

| | | |
|---|---|---|
| DE | 103 48 960 A1 | 5/2005 |
| DE | 10 2005 007 650 A1 | 8/2006 |
| DE | 10 2006 002 175 A1 | 11/2007 |
| JP | 2001 039179 A | 2/2001 |
| WO | 2005/110790 A2 | 11/2005 |
| WO | 2006/010186 A1 | 2/2006 |

* cited by examiner

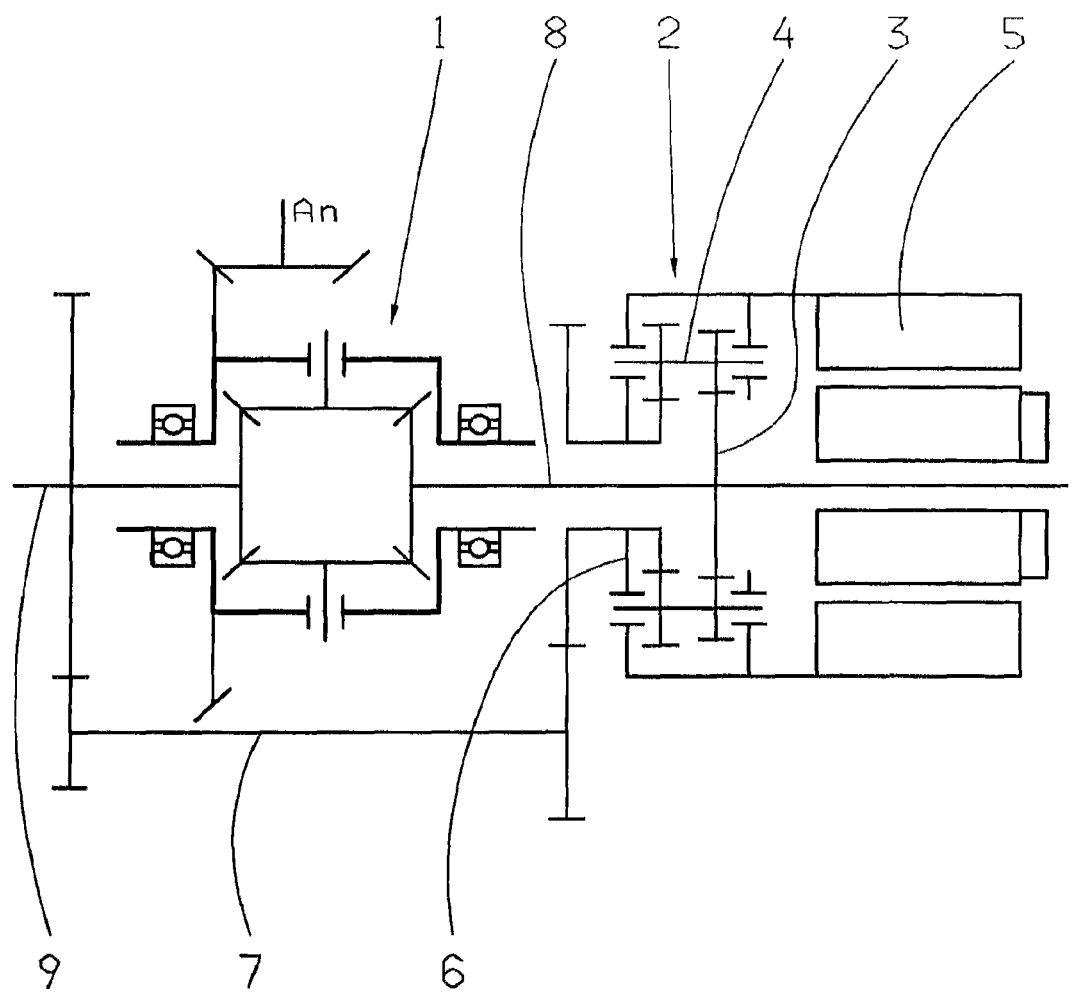

VARIABLE RATIO TRANSMISSION FOR DISTRIBUTING A DRIVE TORQUE TO AT LEAST TWO OUTPUT SHAFTS

This application is a National Stage completion of PCT/EP2008/054965 filed Apr. 24, 2008, which claims priority from German patent application serial no. 10 2007 023 462.9 filed May 19, 2007.

FIELD OF THE INVENTION

The present invention relates to a variable-ratio transmission for distributing a drive torque to at least two output shafts.

BACKGROUND OF THE INVENTION

In vehicles known from the prior art, a drive torque produced by a power source or a drive machine is transferred according to need, via a transmission device, to the drive wheels of a driven vehicle axle. When vehicles are made with more than one driven axle, such as all-wheel drive passenger cars or all-wheel-drive trucks, the power of the drive machine in the drivetrain, of such vehicles, has to be distributed to the individual driven vehicle axles.

In such cases, differential transmissions are used for the power distribution, which are connected, in the power path of a drivetrain of the vehicle, downstream from a main transmission which is provided to enable various transmission ratios to be obtained. Longitudinal differentials are used to distribute the drive power of the drive machine longitudinally to a plurality of driven axles of a vehicle. In addition, so-called transverse differentials or differential transmissions are used for distributing the drive power transversely between two drive wheels of a vehicle axle.

With the help of such distributor transmissions, it becomes possible to distribute a drive torque in any desired ratio to more than one driven axle, without producing stresses in a drivetrain. Furthermore, the use of differential transmissions enables the drive wheels, on a driven axle of the vehicle, to be driven at different speeds independently of one another in accordance with the different path lengths of the left and right tracks, whereby the drive torque can be distributed symmetrically, to both drive wheels, so that no yawing torque is produced.

However, such transmissions have the disadvantage that because of the equalizing action of a differential transmission, the propulsion forces that can be transferred to the road by the two drive wheels of a vehicle axle or of two or more driven axles are always determined by the lower or lowest transferable drive torque of the two drive wheels or of the driven vehicle axles. This means that when, for example, a drive wheel standing on icy ground spins, no torque higher than that of the spinning wheel can be delivered to the other drive wheel, even if the latter is standing on a surface that provides grip. In such a driving situation, owing to the equalizing action of a differential transmission, which makes it possible for two drive output shafts of a differential transmission to rotate at different speeds, the vehicle may be unable to move off.

From DE 103 48 959 A1, by the present applicant, a transmission device for distributing a drive torque to at least two drive output shafts is known, which comprises at least two, at least three-shaft planetary gearsets such that the said planetary gearsets serve as a differential. In this case, a respective shaft of a planetary gearset is connected to a drive input shaft and a respective second shaft of a planetary gearset is connected to one of the drive output shafts. In addition, in each case a third shaft of the planetary gearsets is in active connection with a brake, in such manner, that the degree of distribution of the drive torque between the two drive output shafts varies as a function of the transfer capacity of the said brakes. DE 103 48 959 also describes a method for controlling and regulating the said known transmission device, in which, to distribute a drive torque of a drive machine between the two output shafts of the transmission device, the transfer capacities of the two brakes are adjusted, in such manner, that one brake is in a synchronous condition, and the transfer capacity of the other brake is varied between a lower limit value and an upper limit value, the latter corresponding to the condition of the brake when it is engaged.

DE 103 48 960 A1, by the present applicant, also describes a transmission device for distributing a drive torque to at least two drive output shafts with at least two, at least three-shaft, planetary gearsets, the said planetary gearsets serving as a differential, and such that in each case a shaft of one planetary gearset is connected to a drive output shaft. Furthermore, in each case a shaft of a planetary gearset constitutes one of the drive output shafts so, in each case, at least one other shaft of a planetary gearset is actively connected to a shaft of another planetary gearset. In this way, an operating-status-dependent torque of one shaft can be supported as a function of an operating status of the respective other shaft actively connected to it via the said active connection, in such manner that if a speed difference occurs between the output shafts, by virtue of the active connection, a torque that changes the said speed difference is applied to the planetary gearsets.

Furthermore, from DE 697 10 033 T2 a differential transmission is known which comprises a rotary component, on the input side, in order to receive an external drive force, two rotary components on the output side, which are arranged coaxially with the rotation axis of the rotary component on the input side, and a transmission housing in which the input-side component and the output-side components are mounted to rotate freely, such that a rotating force of the input-side rotary component is transmitted to the output-side rotary components while a rotation speed difference between the output-side rotary components is permitted.

This differential transmission also comprises a first gearwheel, on the input side, which is attached to the input-side rotary component at one axial end thereof and can rotate together with the input-side rotary component, a second gearwheel, on the input side, which is also attached to the input-side component and can rotate with it, a first gearwheel, on the output side, with a delay ratio which is larger or smaller in relation to the first gearwheel on the input side, such that the first gearwheel on the output side can rotate together with the output-side rotary component, a second gearwheel, on the output side, with a delay ratio which is smaller or larger in relation to the second input-side gearwheel, at least one planetary gear, which meshes with the first input-side gearwheel and with the first output-side gearwheel, and at least one second planetary gear, which meshes with the second input-side gearwheel and with the second output-side gearwheel.

In the said transmission according to DE 697 10 033 T2, the second input-side gearwheel on the input-side rotary component is arranged at one axial end, and the second output-side gearwheel can rotate coaxially with one of the rotary components on the output side. In addition, the differential transmission comprises a carrier element which supports the first and the second planetary gears in such manner that they can rotate about their own axes and around the rotation axis of the input-side rotary component.

Furthermore, a first rotation control means for controlling the rotation of the carrier element around the rotation axis of the input-side rotary component with any desired control force, and a second control means for controlling the rotation of the second gearwheel on the output side with any desired control force are provided, and these control means comprising a number of friction plates which can rotate together with the carrier element or with the second output-side gearwheel, and a number of friction plates which can rotate together with the housing; further, pressure means are provided for pressing the said friction plates together with any desired pressure force. Disadvantageously, this known transmission comprises a large number of components; in addition, its manufacturing and assembly costs are high.

From DE 102005022175.3, by the present applicant, a variable-ratio transmission is known which comprises two planetary gearsets, preferably arranged coaxially with one another and one behind the other, which serve as a differential, such that the planetary gearsets have a common annular gear connected to the drive input, the webs of the planetary gearsets are connected respective each to a drive output shaft, and an electric motor is provided, which is connected to the sun gears of the planetary gearsets and by controlling which the torque displacement between the drive outputs is effected.

SUMMARY OF THE INVENTION

The purpose of the present invention is to provide a variable-ratio transmission for distributing a drive torque to at least two output shafts, which comprises a conventional differential, which is simple and inexpensive to construct, and which has the highest possible efficiency.

According to these a variable-ratio transmission is proposed which comprises a conventional differential, which has an electric motor for distributing the drive torque directly between the drive output shafts, and which has a plus planetary gearset that serves as a variable-ratio unit.

According to the invention, a plus planetary gearset is attached, as the variable-ratio unit, besides a conventional differential. In this case, the outer sun gear of the plus planetary gearset is connected to the output of the side facing toward the planetary gearset, and the web of the planetary gearset is connected to an electric motor. Further, the inner sun gear of the planetary gearset is connected, via a countershaft, to the other drive output side.

According to the invention, the fixed transmission ratio of the planetary gearset is exactly compensated by the transmission ratio error of the countershaft so that the electric motor is static when starting off in a straight line.

According to the invention, the electric motor can be made as a motor with an external rotor and a hollow-shaft stator, or as a motor with an internal rotor. Moreover, a slow-run ratio can be realized or provided between the two outputs. In an advantageous further development, a gear stage can be attached on the electric motor.

The concept, according to the invention, provides a simply and inexpensively constructed asymmetric variable-ratio transmission whose efficiency is good.

BRIEF DESCRIPTION OF THE DRAWINGS

Below, the invention will be explained in more detail with reference to the attached FIGURE, which shows a schematic view of a preferred example embodiment of a variable-ratio transmission.

DETAILED DESCRIPTION OF THE PREFERRED EMBODIMENTS

In the FIGURE, a conventional differential is shown, indexed 1, which is driven by a drive input An. A plus planetary gearset 2 is arranged, as a variable-ratio unit, next to the differential 1 and coaxial with a drive output shaft 8 and the outer sun gear of the plus planetary gearset 2 being connected to the drive output shaft 8, on the side of the differential 1 facing toward the planetary gearset 2, and the web 4 of the planetary gearset 2 being connected to an electric motor 5. As can be seen from the FIGURE, the inner sun gear 6 of the planetary gearset 2 is connected, by a countershaft 7, to the other drive output shaft 9. In the example embodiment shown, the electric motor 5 is a motor with an external rotor and a hollow-shaft stator.

According to the invention, the fixed transmission ratio of the planetary gearset 2 is exactly compensated by the transmission ratio error of the countershaft 7 so that, when starting off in a straight line, the electric motor is advantageously static.

INDEXES

1 Differential
2 Planetary gearset
3 Sun gear
4 Web
5 Electric motor
6 Sun gear
7 Countershaft
8 Drive output
9 Drive output

The invention claimed is:

1. A variable-ratio transmission for distributing a drive torque to at least first and second drive output shafts (8, 9), the first and the second drive output shafts are coaxially aligned along an axis, the variable-ratio transmission comprising a differential,
    wherein the variable-ratio transmission further comprises an electric motor (5) for distributing the drive torque directly between the first and the second drive output shafts (8, 9) and a plus planetary gearset (2), which serves as a variable-ratio unit, is arranged coaxially with the first output shaft (8), the first output shaft, which is located on a side of the differential (1) facing toward the planetary gearset (2), is continuously connected to the outer sun gear (3) of the plus planetary gearset (2), and a web (4) of the planetary gearset (2) is connected to the electric motor (5) and directly engages the outer sun gear, and an inner sun gear (6) of the planetary gearset (2) is connected, by a countershaft (7), to the second drive output shaft (9), the countershaft rotates about an axis that is parallel to and radially offset from the axis of the first and the second drive output shafts.

2. The variable-ratio transmission according to claim 1, wherein the electric motor (5) is a motor with an external rotor which comprises a hollow-shaft stator.

3. The variable-ratio transmission according to claim 1, wherein the electric motor (5) is a motor with an internal rotor.

4. The variable-ratio transmission according to claim 1, wherein a fixed transmission ratio of the planetary gearset (2) is exactly compensated by a transmission ratio error of the countershaft (7) so that the electric motor (5) is static when starting off straight.

5. The variable-ratio transmission according to claim 1, wherein a slow ratio is provided between the first and the second output shafts (8, 9).

6. The variable-ratio transmission according to claim 1, wherein the electric motor (5) is connected with a gear step.

7. A variable-ratio transmission for distributing drive torque, the variable-ratio transmission comprising:
  a differential having a drive input which drives first and second differential output shafts, the first and the second differential input shafts each comprise a sun gear that is continuously connected thereto, the first and the second differential output shafts are coaxially aligned along first rotational axis,
  a web comprising two pinions that are continuously connected thereto, a first of the two pinions of the web directly engages the sun gear of the first differential output shaft and a second of the two pinions of the web directly engages an inner sun gear, the web is connected to a rotor of an electric motor;
  a countershaft is aligned along an axis that is radially offset from and parallel to the first rotational axis, the countershaft comprises pinions that are continuously connected to the countershaft at axially opposite ends thereof, one of the pinions of the countershaft directly engages the sun gear of the second differential output shaft and the other of one of the pinions of the countershaft directly engages the second of the two pinions of the web; and
  the first differential output shaft axially extends from one side of the differential toward the web and the electric motor and the second differential output shaft axially extends from an opposite side of the differential away from the web and the electric motor.

* * * * *